(12) United States Patent
Taverner et al.

(10) Patent No.: US 10,451,807 B2
(45) Date of Patent: Oct. 22, 2019

(54) STRAIN ISOLATED FIBER BRAGG GRATING SENSORS

(71) Applicant: WEATHERFORD TECHNOLOGY HOLDINGS, LLC, Houston, TX (US)

(72) Inventors: Domino Taverner, Delray Beach, FL (US); John J. Grunbeck, Northford, CT (US)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 55 days.

(21) Appl. No.: 14/497,573

(22) Filed: Sep. 26, 2014

(65) Prior Publication Data

US 2015/0117810 A1 Apr. 30, 2015

Related U.S. Application Data

(60) Provisional application No. 61/895,093, filed on Oct. 24, 2013.

(51) Int. Cl.
*G02B 6/34* (2006.01)
*G01K 11/32* (2006.01)
(52) U.S. Cl.
CPC ............ *G02B 6/34* (2013.01); *G01K 11/3206* (2013.01); *Y10T 29/49016* (2015.01)
(58) Field of Classification Search
None
See application file for complete search history.

(56) References Cited

U.S. PATENT DOCUMENTS

| 6,356,683 | B1 * | 3/2002 | Hu | G02B 6/0218 |
| | | | | 385/15 |
| 6,493,486 | B1 * | 12/2002 | Chen | G02B 6/0218 |
| | | | | 385/37 |
| 7,024,081 | B2 | 4/2006 | Dowd et al. | |
| 2002/0009252 | A1 * | 1/2002 | Maron et al. | 385/12 |
| 2002/0131709 | A1 * | 9/2002 | Miller | G02B 6/022 |
| | | | | 385/37 |
| 2008/0056639 | A1 * | 3/2008 | MacDougall et al. | 385/12 |
| 2009/0074348 | A1 | 3/2009 | Xia et al. | |
| 2009/0123109 | A1 | 5/2009 | Zhou et al. | |
| 2010/0061678 | A1 | 3/2010 | Swinehart et al. | |

(Continued)

FOREIGN PATENT DOCUMENTS

CN 200952964 Y 9/2007

OTHER PUBLICATIONS

International Search Report and Written Opinion dated Jan. 7, 2015, issued by the European Patent Office.

(Continued)

*Primary Examiner* — Sung H Pak
*Assistant Examiner* — Hoang Q Tran
(74) *Attorney, Agent, or Firm* — Patterson + Sheridan, LLP

(57) ABSTRACT

A sensing device is used for measuring physical characteristics. The sensing device may include an optical fiber disposed in a tube. The optical fiber may have a section containing a fiber Bragg grating (FBG) sensor. A support member may be coupled to the ends of the section, such that the section includes a length greater than a length of the portion of the support member disposed between the ends of the section. The support member is configured to isolate the FBG sensor from strain in the optical fiber.

12 Claims, 2 Drawing Sheets

(56) References Cited

U.S. PATENT DOCUMENTS

2010/0242619 A1 9/2010 Le Blanc et al.
2011/0090486 A1* 4/2011 Udd .............................. 356/73.1

OTHER PUBLICATIONS

Canadian Office Action dated Mar. 9, 2017, for Canadian Patent Application No. 2,925,011.
Chinese Office Action dated Apr. 27, 2017, for Chinese Patent Application No. 201480058009.6.

* cited by examiner

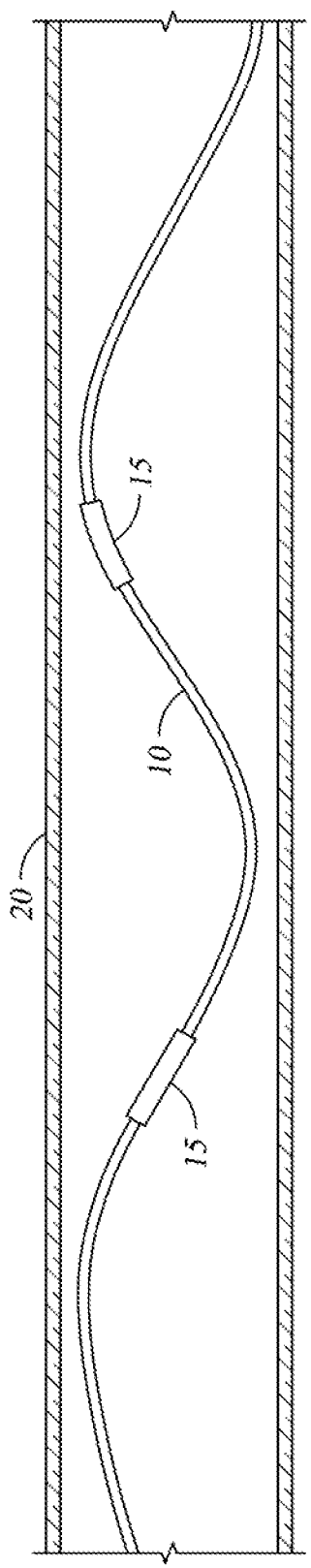
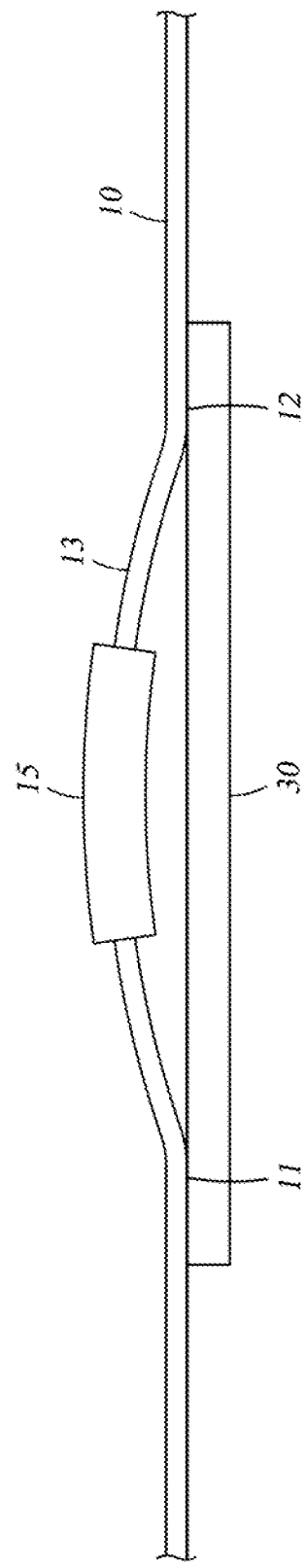

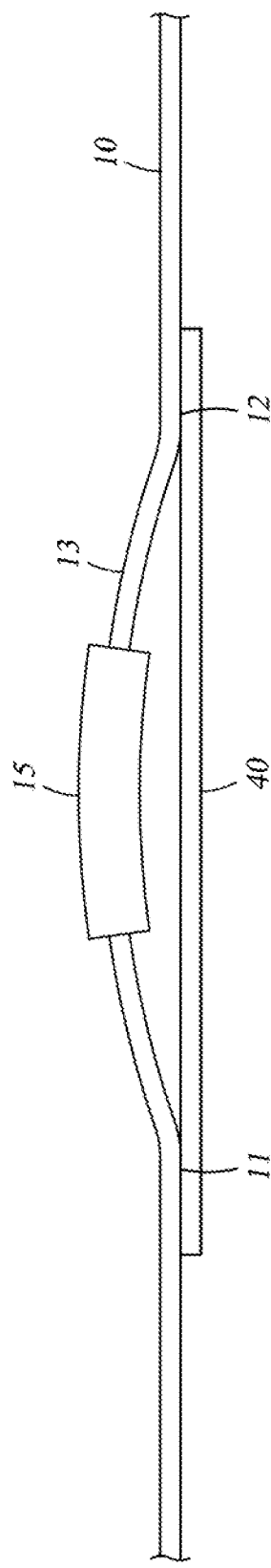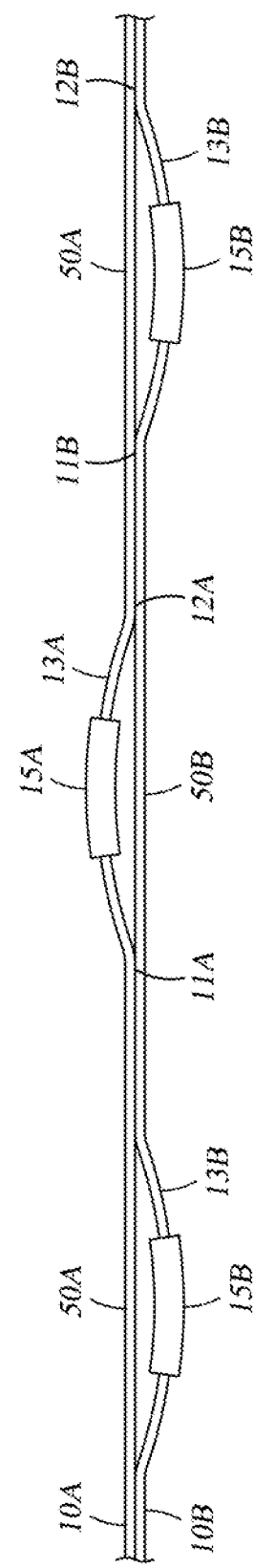

STRAIN ISOLATED FIBER BRAGG GRATING SENSORS

CROSS-REFERENCE TO RELATED APPLICATIONS

This application claims benefit of U.S. Provisional Patent Application Ser. No. 61/895,093, filed Oct. 24, 2013, which application is incorporated herein by reference in its entirety.

BACKGROUND OF THE INVENTION

Field of the Invention

Embodiments of the invention generally relate to optical fibers having one or more strain isolated fiber Bragg grating sensors.

Description of the Related Art

Optical fibers are often disposed within a tube for protection from damage. In some cases, the optical fibers are inserted by pushing the fibers into the tube with the aid of gas or liquids. For example, the optical fibers may be pushed into a metal tube when manufacturing a fiber in metal tube (FIMT), as described in U.S. Pat. No. 7,024,081, herein incorporated by reference in its entirety.

Multiple fiber Bragg grating (FBG) sensors in an optical fiber inside a metal tube forms a useful optical sensor configuration, such as for measuring temperature. To provide accurate temperature measurements, the FBG sensors typically have to be isolated from strain on the optical fiber. Therefore, it is desirable to have some amount of excess fiber length in the metal tube (also known as overstuff) to reduce strain on the FBG sensors. However, it is difficult to achieve specific amounts of excess fiber length, and often requires placing the optical fiber within the metal tube using very time-consuming and expensive controlled operations.

There is a need, therefore, for techniques for isolating strain from FBG sensors on optical fibers.

SUMMARY OF THE INVENTION

A sensing device comprising a tube, and an optical fiber disposed in the tube. The optical fiber may have a section containing a fiber Bragg grating (FBG) sensor. A support member may be coupled to the ends of the section, such that the section includes a length greater than a length of the portion of the support member disposed between the ends of the section. The support member may be configured to isolate the FBG sensor from strain in the optical fiber.

A method of forming a sensing device comprising coupling a support member to the ends of a section of a first optical fiber, the section of the first optical fiber containing a fiber Bragg grating (FBG) sensor, wherein the section includes a length greater than a length of the portion of the support member disposed between the ends of the section.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 illustrates an optical fiber disposed within a tube according to one embodiment.

FIG. 2 illustrates a strain isolated FBG sensor on an optical fiber according to one embodiment.

FIG. 3 illustrates a strain isolated FBG sensor on an optical fiber according to one embodiment.

FIG. 4 illustrates strain isolated FBG sensors on two optical fibers according to one embodiment.

DETAILED DESCRIPTION

Embodiments of the invention relate to isolating strain (tension and compression) from fiber Bragg grating (FBG) sensors in optical fibers. The embodiments of the invention provide strain relief for temperature sensing Bragg gratings in continuous optical fiber strings. The embodiments of the invention include strain relief techniques that can be used to assemble optical fibers having FBG sensors, and install the fibers into tubes for sensing applications in harsh environments.

It is well known that a fiber Bragg grating (FBG) is a type of reflector that can be constructed in a segment of an optical fiber to reflect specific wavelengths of light, while transmitting all other wavelengths of light. It is also well know that optical fibers are flexible, transparent fibers comprised of extruded glass (e.g., silica) or plastic that can transmit light between the two ends of the fiber. Although described herein with respect to FBG sensors in optical fibers, the embodiments of the invention may be used to isolate strain in other types of sensor and/or transmission lines.

FIG. 1 illustrates an optical fiber 10 having one or more FBG sensors 15 disposed in a tube 20. The optical fiber 10 may be inserted into the tube 20 using any technique known in the art. For example, the optical fiber 10 may be pushed into the tube 20 using a mechanical insertion device, or may be floated into the tube using a fluid, such as a pressurized flow of gas or liquid. The tube 20 may be formed out of any material known in the art, such as metal and glass. The tube 20 may comprise one or more sections coupled together such as by welding, brazing, and other connection methods known in the art. For example, one or more sections of the tube 20 may be welded together around the optical fiber 10 or while simultaneously inserting the optical fiber 10 in the tube 20.

As illustrated in FIG. 1, the optical fiber 10 may be inserted into the tube 20 with an amount of excess fiber length (also known as overstuff). In other words, the length of the optical fiber 10 when straightened is greater than the length of the tube 20. The excess fiber length allows the optical fiber 10 to slightly bend and curve into a relaxed state to minimize strain on the optical fiber 10 and the FBG sensors 15 during use. In one embodiment, the amount of excess fiber length may be between about 0.3-0.4 percent of the overall length of the tube 20.

When in use, the tube 20 and the optical fiber 10 may be subjected to temperature fluctuations, which may cause the tube 20 to extend or contract. If there is too little or no excess fiber length, then any expansion of the tube 20 due to thermal changes may cause undue tension in the optical fiber 10. If there is too much excess fiber length, then any contraction of the tube 20 due to thermal changes may cause undue compression in the optical fiber 10. This undue strain on the optical fiber 10, and in particular on the FBG sensors 15, may affect the performance, such as the measurement accuracy, of the FBG sensors 15.

FIG. 2 illustrates a strain isolated FBG sensor 15 in an optical fiber 10 according to one embodiment. In particular, a rigid support 30 is coupled at opposite ends 11, 12 of a section 13 of the optical fiber 10 that contains the FBG sensor 15. The section 13 of the optical fiber 10 may be curved or bowed, such that the length of the section 13 when straightened is greater than the length of the portion of the rigid support 30 disposed between the ends 11, 12 of the section 13. In other words, the portion of the rigid support 30 disposed between the ends 11, 12 of the section 13 is shorter in length than the length of the section 13.

The rigid support 30 is coupled to the optical fiber 10 at a first end 11, and is coupled to the optical fiber 10 at a second end 12, such that the FBG sensor 15 is isolated along the length of the section 13. The rigid support 30 may be coupled to the optical fiber 10 beyond the ends 11, 12 of the section 13. In this manner, any strain in the optical fiber 10, such as tension or compression, may be applied to the rigid support 30 but not the FBG sensor 15. The optical fiber 10 with the rigid support 30 isolated FBG sensors 15 may be inserted into the tube 20 with an excess amount of fiber length using any techniques known in the art.

The rigid support 30 may be coupled to the optical fiber 10 using any technique known in the art, such as by bonding with an epoxy. The rigid support 30 may be formed from any material known in the art, such as a glass or any material having a thermal expansion similar to glass. The rigid support 30 may include any shapes or sizes known in the art. The rigid support 30 may help centralize the optical fiber 10 in the tube 20. The rigid support 30 may include any type of supporting structure configured to isolate strain of the FBG sensor 15 due to operation at extreme temperatures.

FIG. 3 illustrates a strain isolated FBG sensor 15 in an optical fiber 10 according to one embodiment. In particular, a flexible support 40 is coupled at opposite ends 11, 12 of a section 13 of the optical fiber 10 that contains the FBG sensor 15. The section 13 of the optical fiber 10 may be curved or bowed, such that the length of the section 13 when straightened is greater than the length of the portion of the flexible support 40 disposed between the ends 11, 12 of the section 13. In other words, the portion of the flexible support 40 disposed between the ends 11, 12 of the section 13 is shorter in length than the length of the section 13.

The flexible support 40 is coupled to the optical fiber 10 at a first end 11, and is coupled to the optical fiber 10 at a second end 12, such that the FBG sensor 15 is isolated along the length of the section 13. The flexible support 40 may be coupled to the optical fiber 10 beyond the ends 11, 12 of the section 13. In this manner, any strain in the optical fiber 10, such as tension or compression, may be applied to the flexible support 40 but not the FBG sensor 15. The optical fiber 10 with the flexible support 40 isolated FBG sensors 15 may be inserted into the tube 20 with an excess amount of fiber length using any techniques known in the art.

The flexible support 40 may be coupled to the optical fiber 10 using any technique known in the art, such as by bonding with an epoxy. The flexible support 40 may be formed from any material known in the art, such as another fiber or any material having a thermal expansion similar to the optical fiber 10. The flexible support 40 may include any shapes or sizes known in the art. The flexible support 40 may include any type of supporting structure configured to isolate strain of the FBG sensor 15 due to operation at extreme temperatures.

Although both the optical fiber 10 and the flexible support 40 may bend, any tension near the section 13 will be applied to the flexible support 40, leaving the section 13 and the FBG sensor 15 strain free. In one embodiment, the flexible support 40 may be attached along substantially all of the length of the optical fiber 10, except at the sections 13 with the FBG sensors 15 where the flexible support 40 is shorter in length than the section 13.

FIG. 4 illustrates strain isolated FBG sensors 15A, 15B in optical fibers 10A, 10B according to one embodiment. In particular, two optical fibers 10A, 10B may be coupled together such that support sections 50 of one optical fiber (such as support sections 50A of optical fiber 10A) act as supports for sections 13 having FBG sensors 15 of the other optical fiber (such as sections 13B having FGB sensors 15B of optical fiber 10B). The support sections 50A, 50B function similar to the rigid and flexible supports 30, 40 by isolating the FBG sensors 15A, 15B from strain in the optical fibers 10A, 10B.

The support sections 50A, 50B are coupled at opposite ends 11A, 12A and 11B, 12B of sections 13A, 13B of the optical fibers 10A, 10B that contain the FBG sensors 15A, 15B. The sections 13A, 13B may be curved or bowed, such that the length of the sections 13A, 13B when straightened are greater than the length of the support sections 50A, 50B disposed between the ends 11A, 12A and 11B, 12B. In other words, the support sections 50A, 50B disposed between the ends 11A, 11B and 12A, 12B of the sections 13A, 13B are shorter in length than the length of the sections 13A, 13B.

In one embodiment, the sections 13A, 13B with the FBG sensors 15A, 15B may be alternately formed along the length of the optical fibers 10A, 10B. In one embodiment, multiple sections 13A having FBG sensors 15A may be formed along the length of the optical fibers 10A, 10B between only one section 13B having an FBG sensor 15. In one embodiment, one portion of the length of the optical fibers 10A, 10B may include only sections 13A having FGB sensors 15A, while a separate portion of the length of the optical fibers 10A, 10B may include only sections 13B having FBG sensors 15B.

In this manner, any strain in the optical fiber 10, such as tension or compression, may be applied to the support sections 50A, 50B but not the FBG sensors 15A, 15B. The optical fibers 10A, 10B with the isolated FBG sensors 15A, 15B may be inserted into the tube 20 with an excess amount of fiber length using any techniques known in the art. The optical fibers 10A, 10B and/or the support sections 50A, 50B may be coupled together using any technique known in the art, such as by bonding with an epoxy. The support sections 50A, 50B may be formed from the same material as the optical fibers 10A, 10B, or may be formed from a different material known in the art. The support sections 50A, 50B may have the same diameters as the remaining portions of the optical fibers 10A, 10B, or may have different diameters relative to the remaining portions of the optical fibers 10A, 10B.

The embodiments of the invention include one or more combinations of the embodiments described above with respect to FIGS. 2, 3, and 4. The optical fibers 10 described herein may include any length, shape, diameter, or type known in the art. The optical fibers 10 described herein may include any type of coating, such as a polyimide coating. The optical fibers 10 described herein may include single and/or multi-mode fibers.

In one embodiment, the optical fibers 10, the rigid support 30, the flexible support 40, and/or the support sections 50 may be formed form a metalized fiber and may be welded and/or soldered together. In one embodiment, the optical fibers 10, FBG sensors 15, the tube 20, the rigid support 30, the flexible support 40, and/or the support sections 50 may be configured to measure temperature, pressure, strain, and/or any other physical characteristic known in the art, in any type of environment, such as in downhole, wellbore applications. In one embodiment, multiple optical fibers 10 having FBG sensors 15 may be isolated from strain using only one rigid support 30, flexible support 40, and/or support section 50. A single support member, such as the rigid support 30, the flexible support 40, and/or the support section 50, may be used to isolate sections 13 containing one or more FBG sensors 15 of multiple optical fibers 10.

While the foregoing is directed to embodiments of the invention, other and further embodiments of the invention may be devised without departing from the basic scope thereof, and the scope thereof is determined by the claims that follow.

We claim:

1. A sensing device, comprising:
   a tube;
   a first optical fiber disposed in the tube, the first optical fiber having a section containing a fiber Bragg grating (FBG) sensor; and
   a support member having a first end coupled to the first optical fiber on one side of the sensor and having a second end coupled to the first optical fiber on an opposite side of the sensor, wherein an unstrained length of the section disposed between the first and second ends of the support member is greater than a length of a portion of the support member from the first end to the second end, wherein the FBG sensor is isolated on the unstrained length by the support member from any tension or compression applied to the first optical fiber due to thermal variations, and wherein the support member is formed from the same material as the first optical fiber.

2. The device of claim 1, wherein the support member is flexible.

3. The device of claim 2, wherein the support member is another fiber.

4. The device of claim 1, wherein the support member is part of a second optical fiber disposed in the tube, the second optical fiber containing an FBG sensor.

5. The device of claim 4, wherein the FBG sensor of the second optical fiber is isolated from strain by a support section of the first optical fiber.

6. The device of claim 4, wherein a section of the second optical fiber containing the FBG sensor is coupled to a support section of the first optical fiber, the support section of the first optical fiber having a length shorter than a length of the section of the second optical fiber containing the FBG sensor.

7. The device of claim 1, wherein the tube is formed from metal.

8. A method of forming a sensing device, comprising:
   coupling a first end of a support member to a first optical fiber containing a fiber Bragg grating (FBG) sensor on one side of the sensor; and
   coupling a second end of the support member to the first optical fiber on an opposite side of the sensor such that an unstrained length of the first optical fiber disposed between the first and second ends of the support member is greater than a length of a portion of the support member from the first end to the second end, wherein the FBG sensor is isolated on the unstrained length by the support member from any tension or compression applied to the first optical fiber due to thermal variations, and wherein the support member is formed from the same material as the first optical fiber.

9. The method of claim 8, wherein the support member is flexible.

10. The method of claim 8, wherein the support member is part of a second optical fiber.

11. The method of claim 10, wherein a section of the second optical fiber that contains a FBG sensor is coupled to a support section of the first optical fiber, the support section of the first optical fiber having a length shorter than a length of the section of the second optical fiber containing the FBG sensor.

12. The method of claim 8, further comprising inserting the first optical fiber into a tube.

* * * * *